United States Patent [19]
Yuyama et al.

[11] Patent Number: 6,041,963
[45] Date of Patent: Mar. 28, 2000

[54] AMPULE COLLECTOR

[75] Inventors: Shoji Yuyama; Naoki Koike; Yosuke Ishimura; Nakaji Takeda, all of Toyonaka, Japan

[73] Assignee: Kabushiki Kaisha Yuyama Seisakusho, Osaka, Japan

[21] Appl. No.: 09/045,903

[22] Filed: Mar. 23, 1998

[30]   Foreign Application Priority Data

Mar. 25, 1997  [JP]  Japan .................................... 9-071625
May 30, 1997  [JP]  Japan .................................... 9-142473

[51] Int. Cl.⁷ .................................................. B65H 3/60
[52] U.S. Cl. ........................................... 221/203; 221/277
[58] Field of Search .............................. 221/7, 9, 15, 92, 221/277, 203, 258, 262; 414/268, 301

[56]             References Cited
          U.S. PATENT DOCUMENTS 4,822,318  4/1989  Okada ...................................... 221/203
5,564,879  10/1996  Noguchi .................................. 414/268

*Primary Examiner*—Kenneth W. Noland
*Attorney, Agent, or Firm*—Wenderoth, Lind & Ponack, L.L.P.

[57]             ABSTRACT

An ampule collector which can collect selected ampules from corresponding feeders without breakage and jamming of ampules. The ampule collector has a plurality of cylindrically stacked ampule feeders in which are stored different kinds of ampules. In order that ampules, discharged from selected feeders drop only a short distance, a vertically movable ampule collecting container is provided in the center of the cylindrical structure defined by the feeders. Jamming of ampules is prevented by rotating a bottom cover provided at the center of the ampule collecting container, stirring ampules with protrusions formed on the conical inner surface, and changing the directions of the ampules with vanes provided on the conical inner surface. With the container inserted in an ampule stocker provided under the bottom cover, it is possible to supply ampules into the stocker without breaking them.

14 Claims, 10 Drawing Sheets ial view of an ampule

AMPULE COLLECTOR

BACKGROUND OF THE INVENTION

This invention relates to an ampule collector for collecting different kinds of injection ampules dispensed per prescriptions from ampule feeders for individual patients.

Ampule collecting devices used in hospitals to collect injection drug ampules prescribed for each patient are disclosed in unexamined Japanese patent publications 2-28416 and 2-28417, which are both filed by the applicant of this invention. In these devices, ampules that are different in size (extra large LL, large L, medium M, small S) and contain different kinds of injection drugs prescribed for each patient are selected and taken out of a cassette housing, put by sizes on a plurality of vertically arranged horizontal conveyors, transferred onto a vertical conveyor at the end of the delivery ends of the horizontal conveyors by a transfer means, and arranged and discharged by a setting means when they pass the highest point of the vertical conveyor.

The abovementioned transfer means temporarily stocks ampules received from the horizontal conveyors, and pushes up ampules one by one with a pusher onto the vertical conveyor. These ampule collecting devices can prepare ampules for a plurality of patients in a short time with high efficiency, because as soon as ampules for one patient are transferred onto the vertical conveyor, i.e. well before these ampules are discharged by the setting means, ampules for the next patient are selected and put on the conveyors.

These ampule collecting devices can transfer ampules for a plurality of patients efficiently in a sufficiently short time. But if the conveyor speed and the speed at which the pusher is pushed up are increased in an attempt to further shorten the ampule preparation time, ampules may be broken by the pusher. In order to prevent breakage of ampules, the pusher has to be pushed up at a relatively slow speed.

With the transfer means or setting device, ampules are transferred between members having different heights, so that ampules tend to be broken by colliding against each other or against parts of the device even if the feed speed is low. These devices need many parts such as cassette trays, horizontal conveyor, transfer means, vertical conveyor, setting means, etc and are naturally complicated in structure and bulky.

An object of this invention is to provide an ampule collector which is free of these problems, and which can collect and discharge ampules efficiently in a short time without breakage and clogging of ampules.

SUMMARY OF THE INVENTION

According to this invention, there is provided an ampule collector comprising a plurality of ampule feeders stacked one on another, each of the ampule feeders accommodating a plurality of ampules and capable of discharging ampules one at a time, and an ampule collector means rising and lowering along the stacked feeders for collecting ampules from the ampule feeders on each level, the ampule collector means including an ampule stirring means and an ampule discharge port.

The ampule collector according to the invention has many ampule feeders stacked one on another. The ampule collector means rises and lowers along the ampule feeders to collect and supply a plurality of ampules of different kinds discharged continuously or discontinuously from selected feeders for each patient without breakage and clogging of ampules.

The ampule collector means rises or lowers to the ampule discharge level to collect ampules from selected ampule feeders, so that ampules fall only a short distance. The ampule collector means has an ampule stirring means to prevent ampules from collecting to a narrow space. Thus, ampules are less likely to get jammed or broken.

When ampules for a particular patient have been collected, the ampule collector means descends and discharges the collected ampules through the discharge port. An ampule stocker is provided near the ampule collector means when the latter is lowered to the lowest position so that ampules discharged through the discharge port can be put in the ampule stocker without the fear of breakage.

Other features and objects of the present invention will become apparent from the following description made with reference to the accompanying drawings, in which:

DETAILED DESCRIPTION OF THE PREFERRED EMBODIMENT

Figure 1:
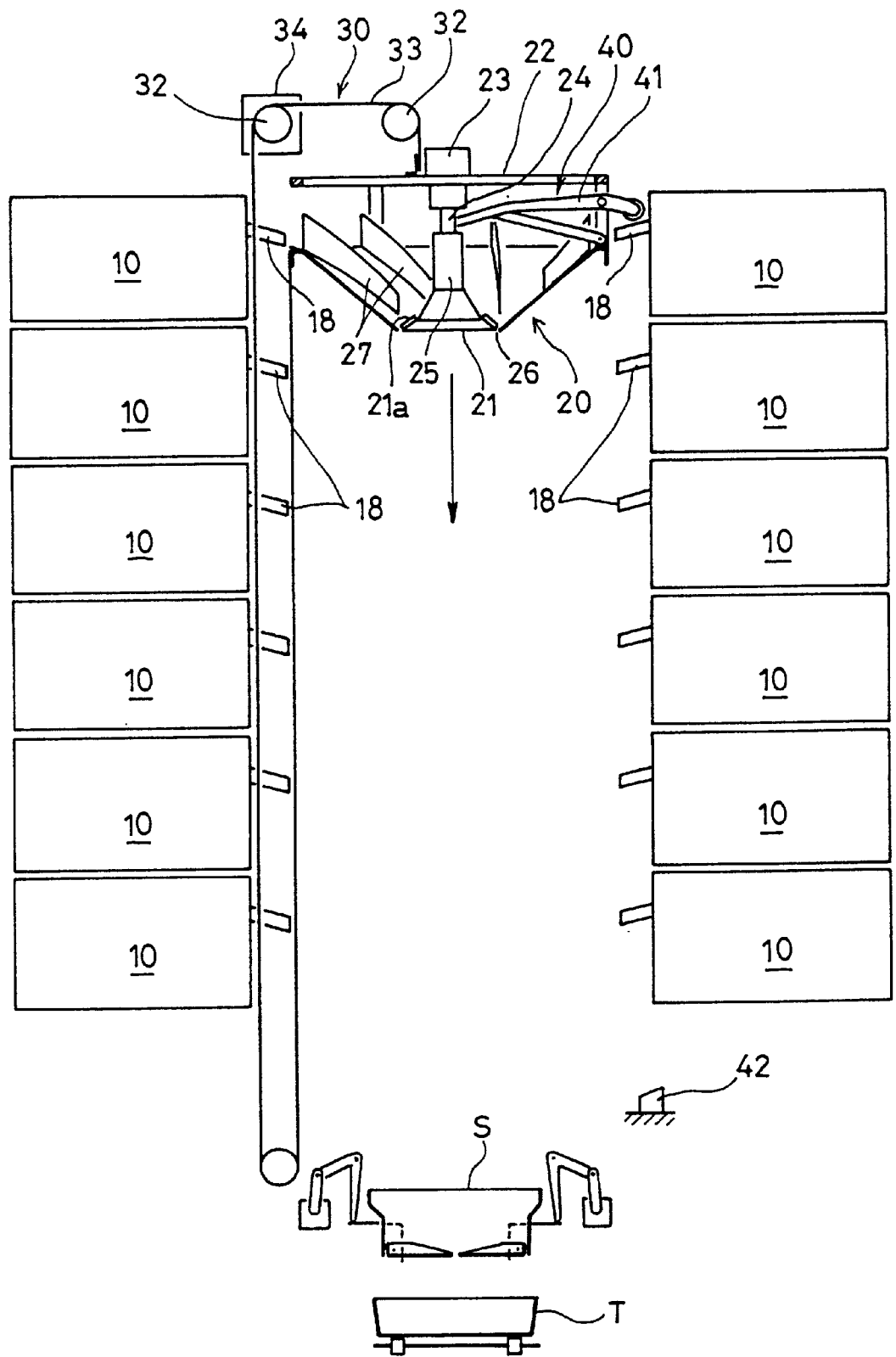
FIG. 1 is a schematic partial sectional view of an ampule collector embodying the invention.
Figure 2:
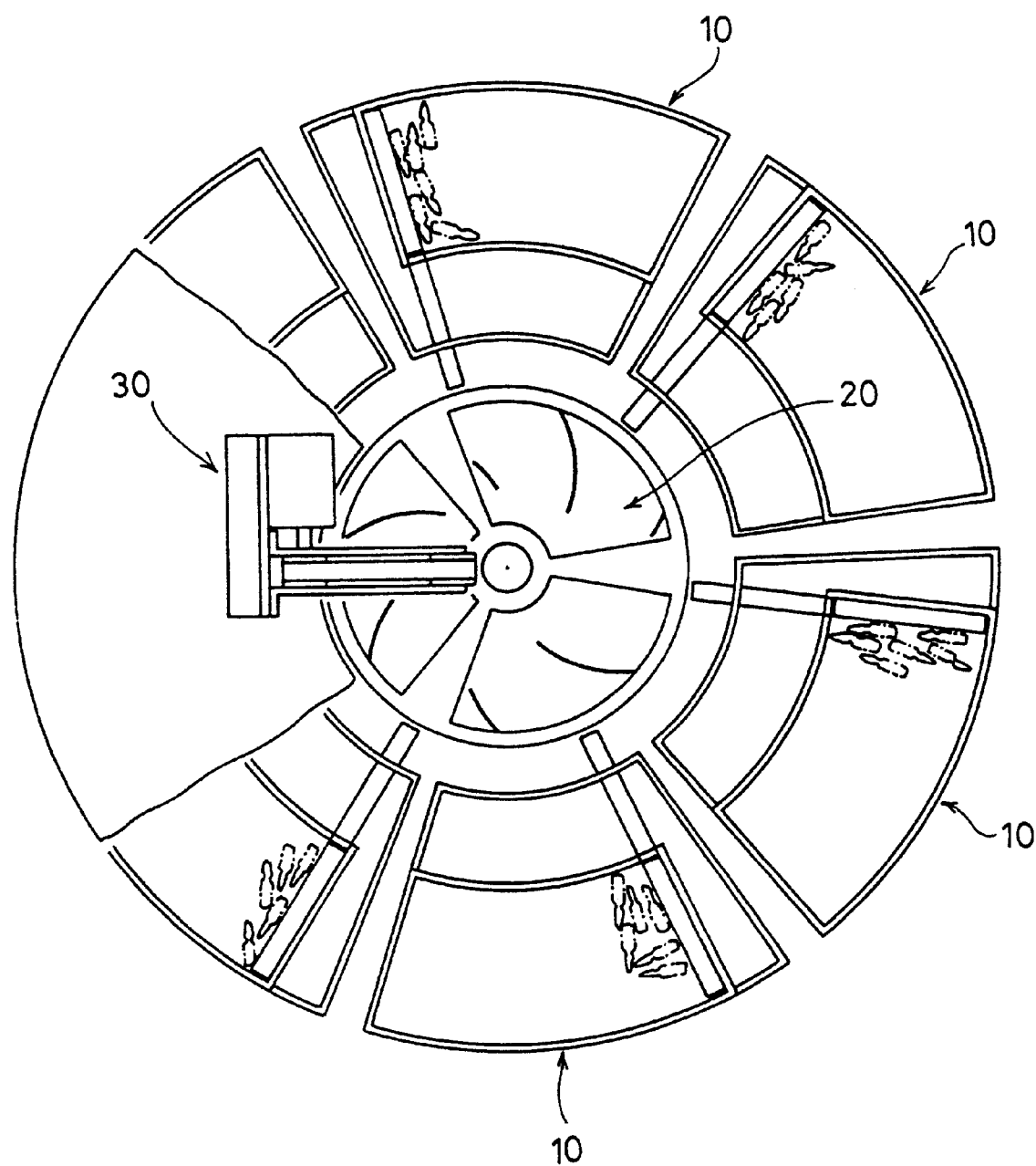
FIG. 2 is a plan view of the ampule collector shown in FIG. 1.

An embodiment of this invention is now described with reference to the drawings. Referring to FIGS. 1 and 2, the collector includes ampule feeders 10, an ampule collecting container 20, an elevator means 30 for moving the container 20 up and down, and a container bottom opener 40. The feeders 10 are stacked one on another to form a cylinder. Ampules may be put randomly in the feeders 10 as shown, or in an orderly manner.

Figure 3:
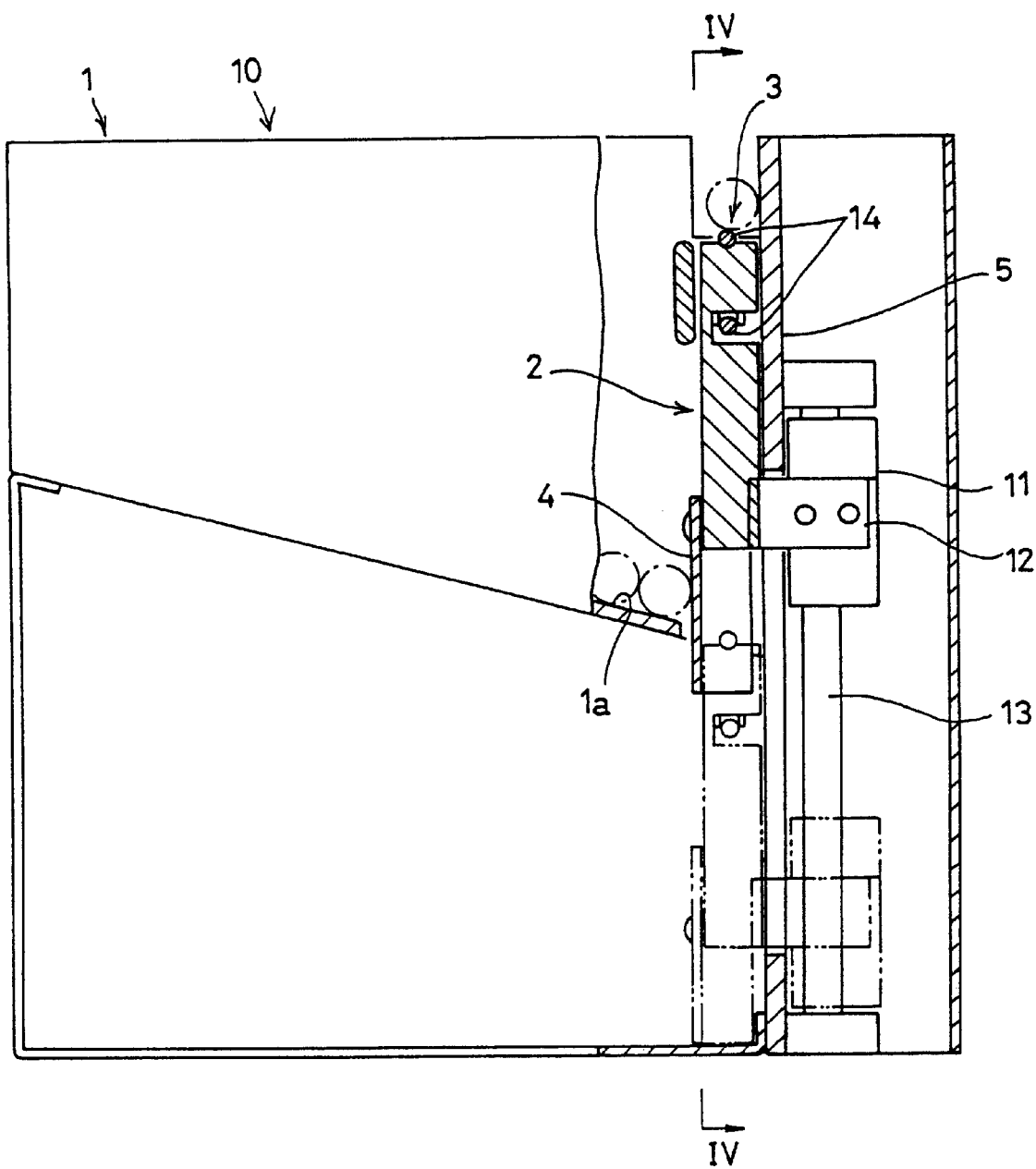
FIG. 3 is a front view of an ampule feeder.
Figure 4:
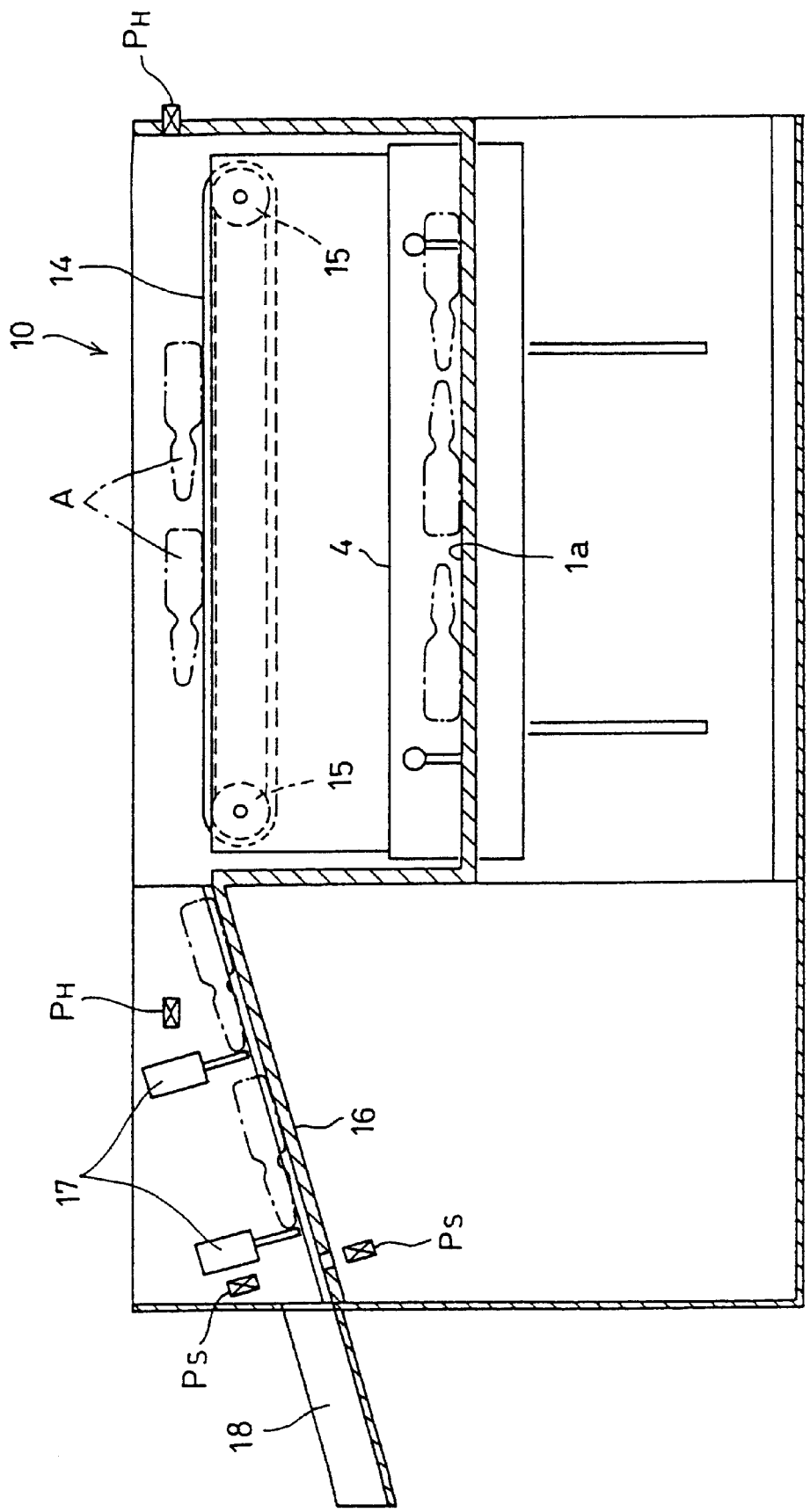
FIG. 4 is a side section taken along line IV—IV of FIG. 3.

The ampule feeders 10 shown are mere examples, and thus are described only briefly. As shown in FIGS. 3 and 4, each ampule feeder 10 comprises an ampule container 1 in which ampules are put randomly, an ampule lifter 2 vertically movable along a side wall of the container 1, and an ampule dispenser 3 incorporated in the lifter 2.

The ampule container 1 has an inclined bottom plate 1a so that ampules in the container 1 spontaneously slide down the bottom plate 1a toward the lifter 2. The ampule lifter 2 has substantially the same width as the diameter of the ampules and is at least 1.5 times longer than ampules A. The lifter thus arranges ampules A supported thereon while rising along the side wall 5.

The dispenser 3 comprises a horizontal endless belt 14 mounted on the top of the lifter 2. The ampule lifter 2 is coupled through arms 12 to a slider 11 slidable up and down along support rods 13. As the slider 11 is moved up and down by a motor (not shown), the lifer 2 is moved up and down inside the side wall together with the slider 11.

The slider 11 has a support arm (not shown) on which is supported a motor (not shown) for driving the dispenser 3. Specifically, this motor drives pulleys 15 supporting the endless belt 14.

Figure 5:
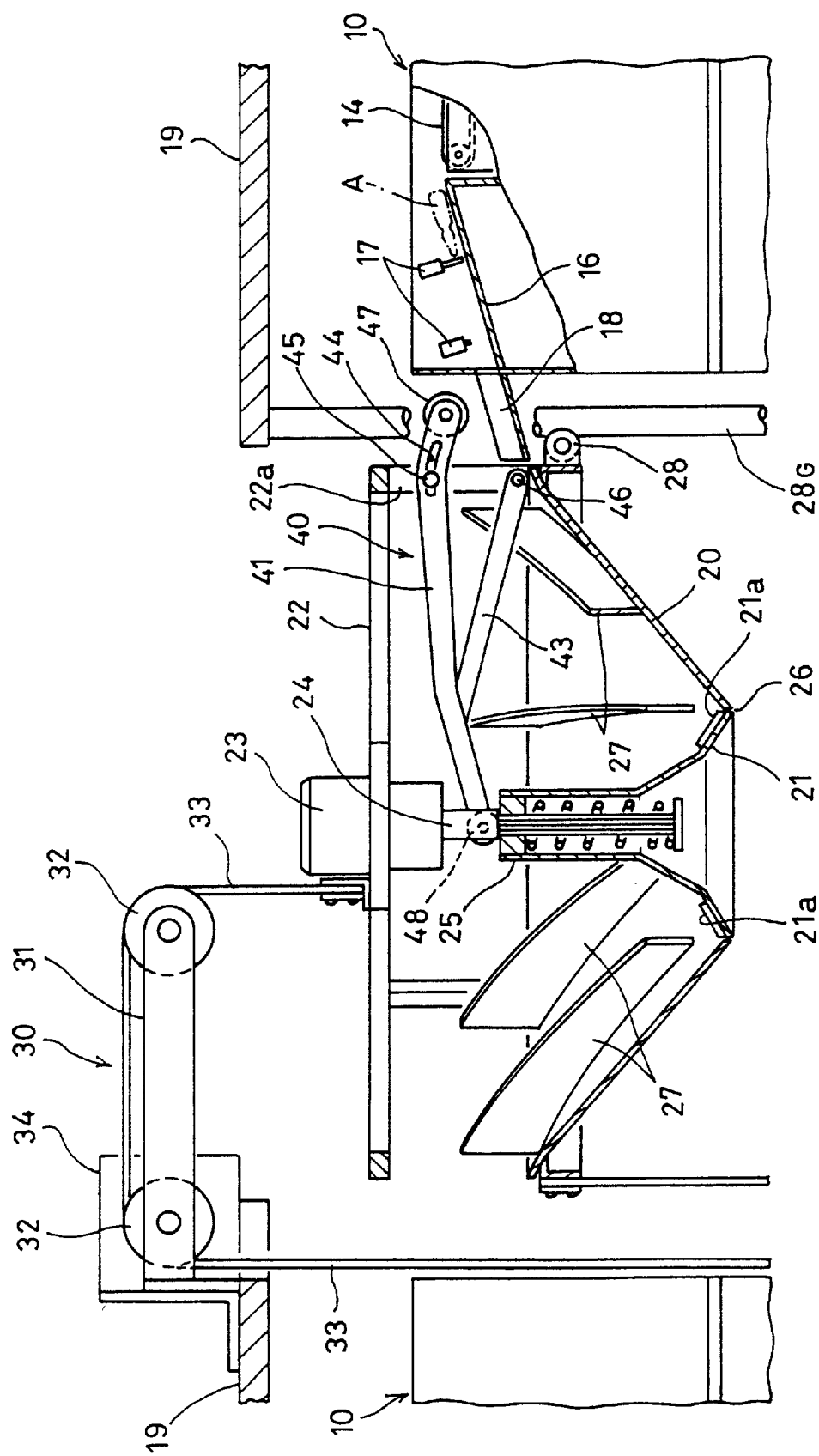
FIG. 5 is a detailed sectional view of an upper portion of the ampule collector of FIG. 1.

Aligned with the discharge port of the dispenser 3, an ampule reserve passage 16 for temporarily stocking ampules is provided (FIGS. 4 and 5). At least two solenoids 17 are provided along the passage 16. With two ampules stopped by protruding rods of the solenoids, the rod of the front solenoid is retracted and then protruded, and then the rod of the rear solenoid is retracted and protruded. This cycle is repeated to discharge ampules one by one.

Referring to FIG. 1, a conical ampule collecting container 20 is vertically movably provided along the cylindrical shaft defined by the plurality of cylindrically arranged ampule feeders 10. The container 20 is moved to the level of any particular ampule feeder or feeders to collect ampules from the respective feeders without breaking them.

Figure 6:
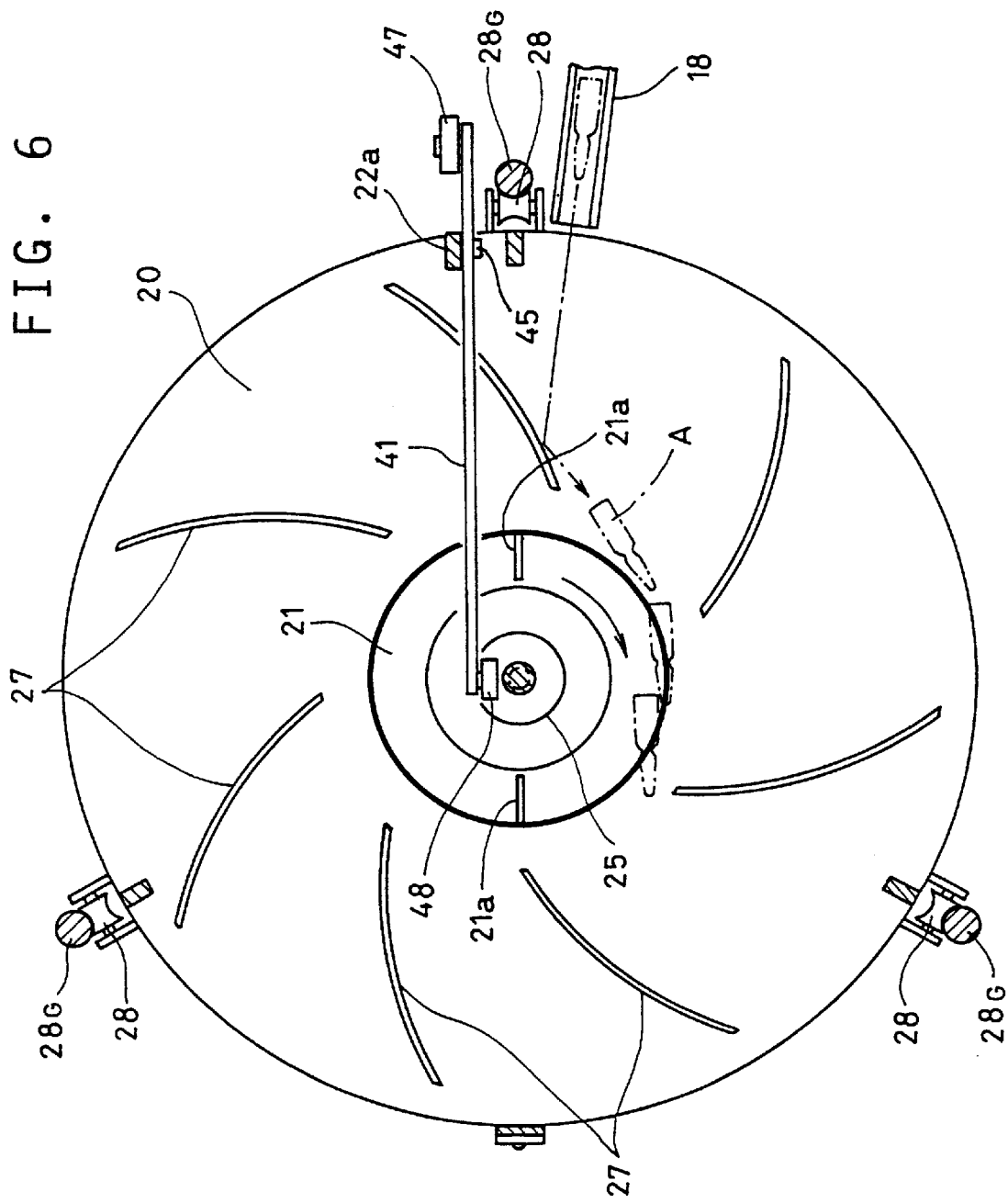
FIG. 6 is a plan view of an ampule collecting container.

As shown in detail in FIG. 5, the ampule container 20 is a vertical conical member similar in shape to an ant lion's nest, and has a bottom cover 21 at its central bottom portion. Inside the container 20, a plurality of arcuate guide vanes 27 are provided at equal angular intervals (FIG. 6) to change the directions of falling ampules. Also shown in FIG. 6 are guide rollers 28 for guiding the vertical movement of the container 20 and their guide rods 28G. The bottom plate 21 is fixed to the bottom end of a coupling member 25 coupled to a lower portion of a coupling rod 24 coupled to the output shaft of a motor 23 so as to extend downwardly from the motor 23. A plurality of (two in the embodiment) ribs 21a are provided on the inner surface of the bottom cover 21 to stir ampules.

The rod 24 has its splined portion coupled to the coupling member 25 so as to be nonrotatable relative to the member 25 but axially movable through a resilient member (coil spring in this example). While no downward pressure is being applied to the coupling member 25, a discharge port 26 formed in the bottom of the container 20 is closed by the bottom cover 21.

To open the discharge port 26, the arm 41 of the container bottom opening mechanism 40 is pivoted to push down the member 25 with its tip and thus to move the bottom cover 21 downward. The mechanism 40 comprises a block 42 (FIG. 7) fixed to a stationary member provided at a lower portion of the cylindrical structure formed by the ampule feeders 10, and the arm 41 rotatably supported by a vertical support frame 22a provided over the container 20 so as to surround it.

As shown, the arm 41 is a member bent at its intermediate portion and having an outer end thereof protruding from the container 20 and the inner end extending to the coupling member 25. Near the outer end, the arm 41 is formed with a round elongated hole 44 in which is engaged a pin 45 fixed to a vertical portion of the support frame 22a. Thus, movement of the arm 41 is guided by the pin 45. A support arm 43 extends obliquely outwardly from an intermediate portion of the arm 41, and has its outer end pivotably supported on a support shaft 46 provided on the vertical portion of the support frame 22a. The arm 41 is thus pivoted about the shaft 46. The arm 41 carries at its outer end a roller 47 and at its inner end a head 48 (FIG. 8) for pushing down the coupling member 25.

The elevator means 30 (FIG. 5) for moving the ampule collecting container 20 up and down includes a horizontal support arm 31 fixed to a top plate 19 of the cylindrical structure made up of the plurality of ampule feeders 10. A toothed belt 33 is trained around pulleys 32 (FIG. 7) provided near both ends of the arm 31 and another pulley 32 provided under a bottom plate 19', and is driven by a motor 34. The belt 33 has one end thereof coupled to the output shaft of the ampule stirring motor 23 and the other end to the outer periphery of the container 20. Thus, by moving the belt in either direction, the container 20 is raised and lowered.

Figure 7:
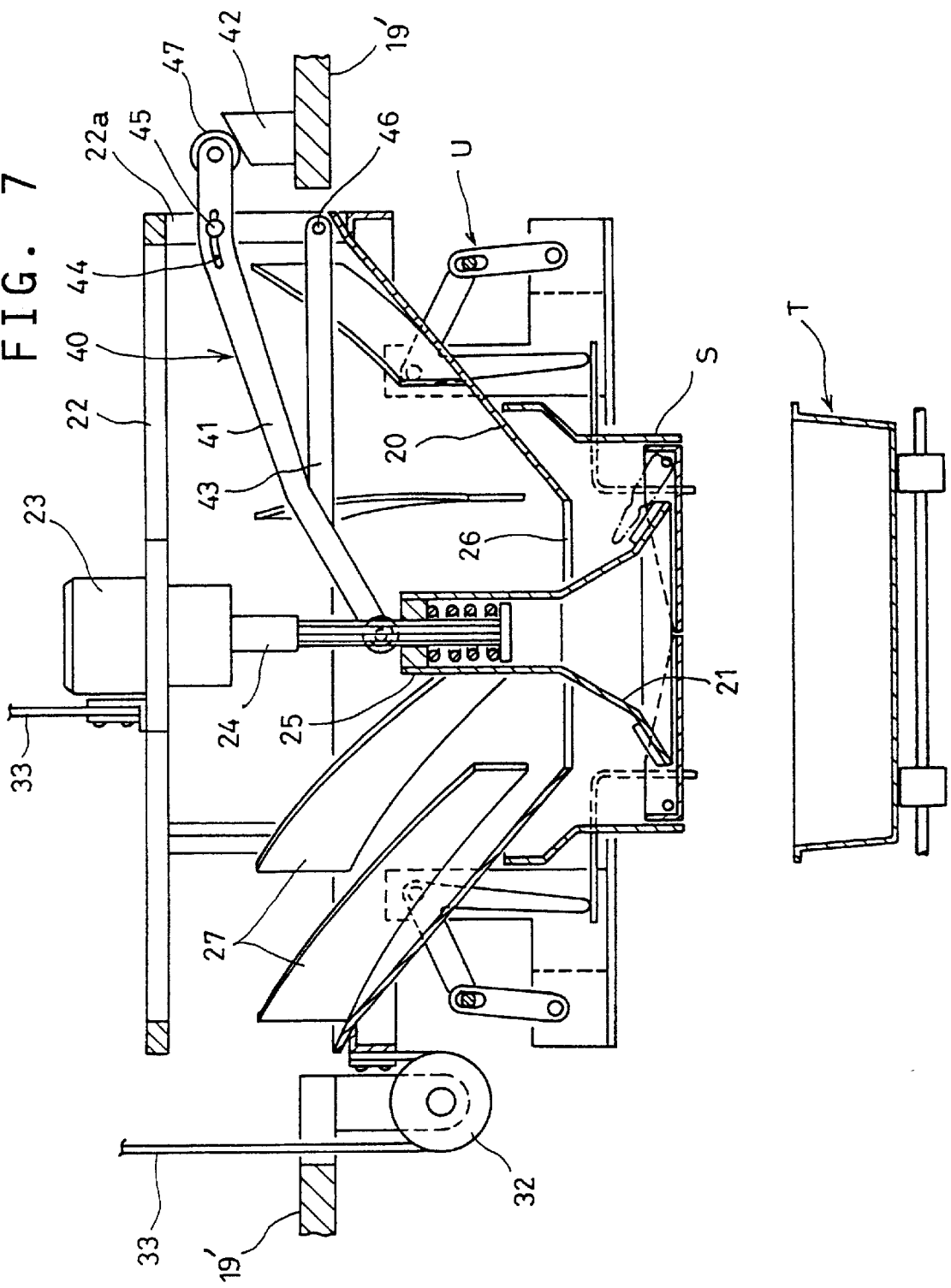
FIG. 7 illustrates the operation of the ampule collector of FIG. 1.

An ampule stocker S is standing by under the container 20 when the latter is lowered to the lowest position to receive ampules discharged from the container 20 by opening the bottom cover 21 (FIG. 7). The ampule stocker S has a shutter means U for opening the bottom of the stocker when the stocker receives the ampules and is lowered into a bucket T being fed by a conveyor under the stocker to empty ampules into the bucket. The shutter means U is however not the point of this invention, and thus will not be described any further.

Description is now made on how the ampule collector of the invention collects ampules A from selected ampule feeders 10 and supplies them to the ampule stocker.

When a particular kind of ampules for a particular patient are designated based on a prescription, a corresponding feeder is activated to discharge ampules one by one. Ampule feeders 10 shown are mere examples and their detailed description is omitted.

When a particular kind of ampules is designated for a particular patient, the ampule collecting container 20, which is initially at the lowest position, is raised to the level of the ampule feeder 10 containing the designated kind of ampules by the elevator means 30 to collect ampules from the feeder. In this state, the bottom plate 21 of the container is closed to prevent the fall of collected ampules.

If a plurality of kinds of ampules are designated for a particular patient, the container 20 visits the corresponding feeders one by one from the nearest one or in any other more rational order to collect ampules from these feeders.

In the case where a plurality of kinds of ampules, e.g. 8–10 for each kind, are designated for a particular patient, if an ampule discharged from the discharge port 18 of a corresponding feeder 10 remains where it is discharged, this ampule may be broken by subsequently discharged ampules.

According to the invention, the rotating bottom cover 21 is adapted to rotate while the container 20 is collecting ampules, so that ampules discharged from feeders and collected onto the central part of the container by sliding on the inclined bottom of the container are moved in circles by the rotating bottom cover 21 while being stirred. This prevents ampules from being broken by colliding against each other.

The ribs formed on the top surface of the bottom cover 21, which protrude into the conical interior of the container 20, stir a plurality of ampules collecting onto the cone as the bottom cover rotates. Ampules are thus dispersed and prevented from getting broken by colliding against each other.

Ampules discharged from selected ampule feeders 10 change their direction by hitting the arcuate guide vanes 27 provided in the conical interior of the container 20 before hitting the bottom cover 21. Ampules are thus fed in circles and dispersed by the rotating bottom cover 21 without directly colliding against each other. This prevents clogging of ampules.

When all the ampules prescribed for a particular patient have been collected into the container 20, the latter descends and empties the ampules therein into the ampule stockers in the following manner. As the container 20 descends, the roller 47 at the outer end of the arm 41 of the container bottom opening mechanism 40 abuts the block 42 before the container 20 lowers to the lowest position. When the container 20 further descends from this position, the arm 41 pivots counterclockwise about the horizontal shaft 46 with the roller 47 at the outer end of the arm in abutment with the block 42, so that its inner end moves downward at a higher speed than the container 20.

Thus, the inner end of the arm 41 pushes down the coupling member 25 at the lower end of the coupling rod 24 together with the bottom cover 21, opening the discharge port 26 formed in the bottom of the container 20. Ampules in the container are thus discharged through the discharge port 26 into the ampule stockers S. Ampules are discharged with the bottom cover of the container 20 almost in contact with the bottom of the ampule stocker S, the ampules fall only a short distance, so that they are rarely broken.

In the above embodiment, ampules are randomly placed in ampule feeders, and the ampule feeders are arranged cylindrically. But ampules may be arranged in an orderly manner in feeders and/or the feeders may be arranged in any other way.

Figure 8:
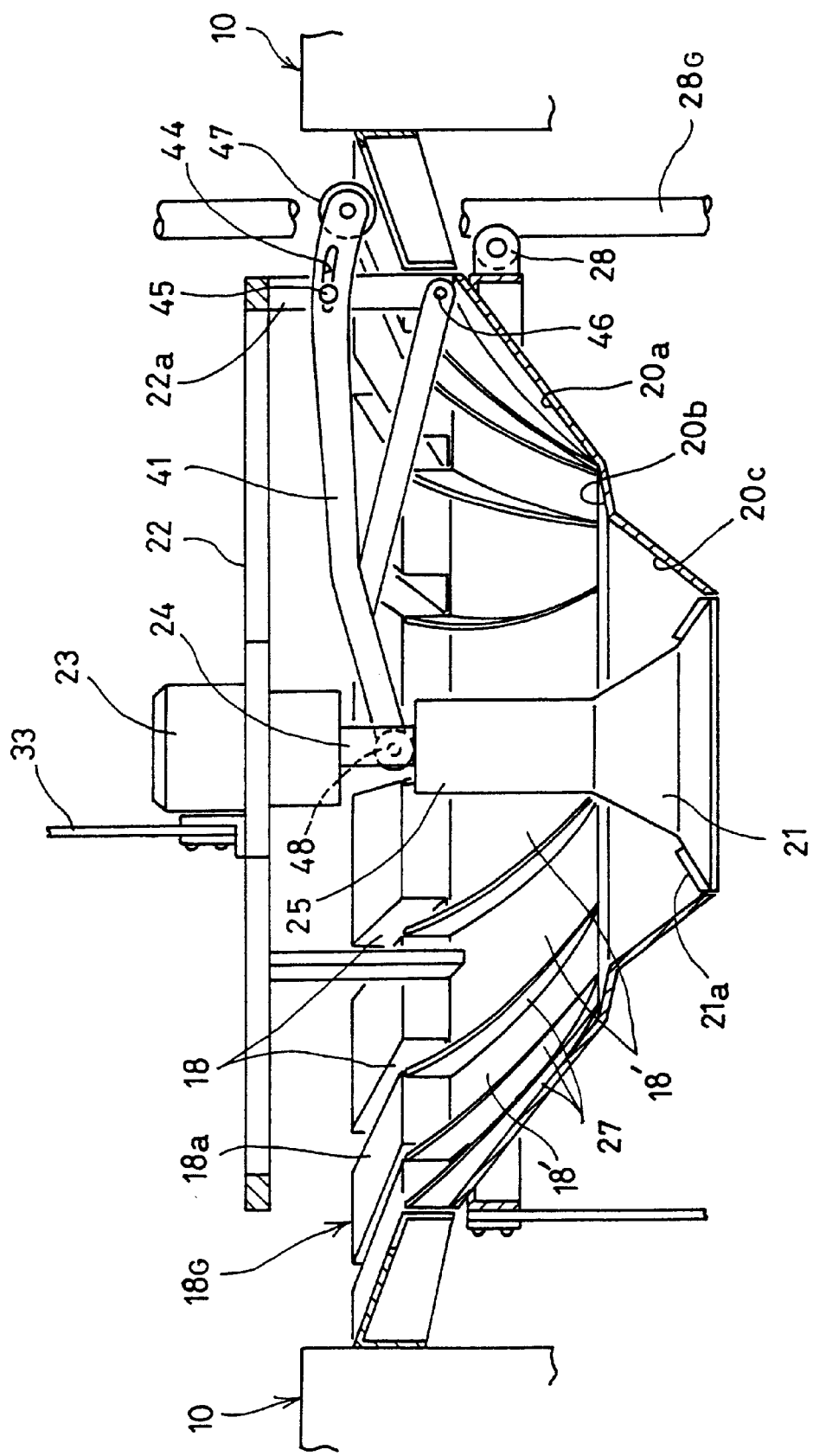
FIG. 8 is a sectional view of an upper portion of an ampule collector of a second embodiment.
Figure 9:
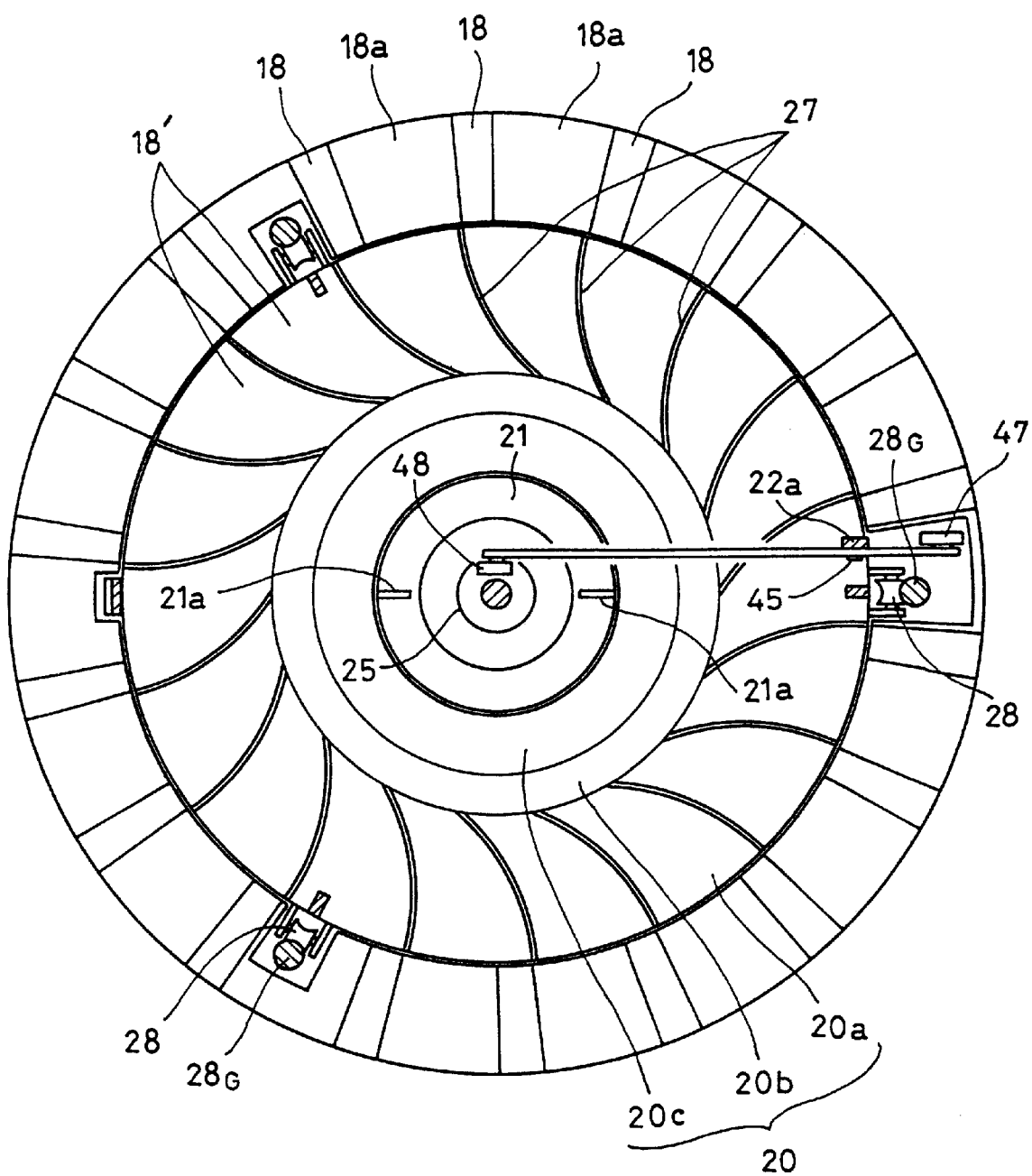
FIG. 9 is plan view of the ampule collector shown in FIG. 8.
Figure 10:
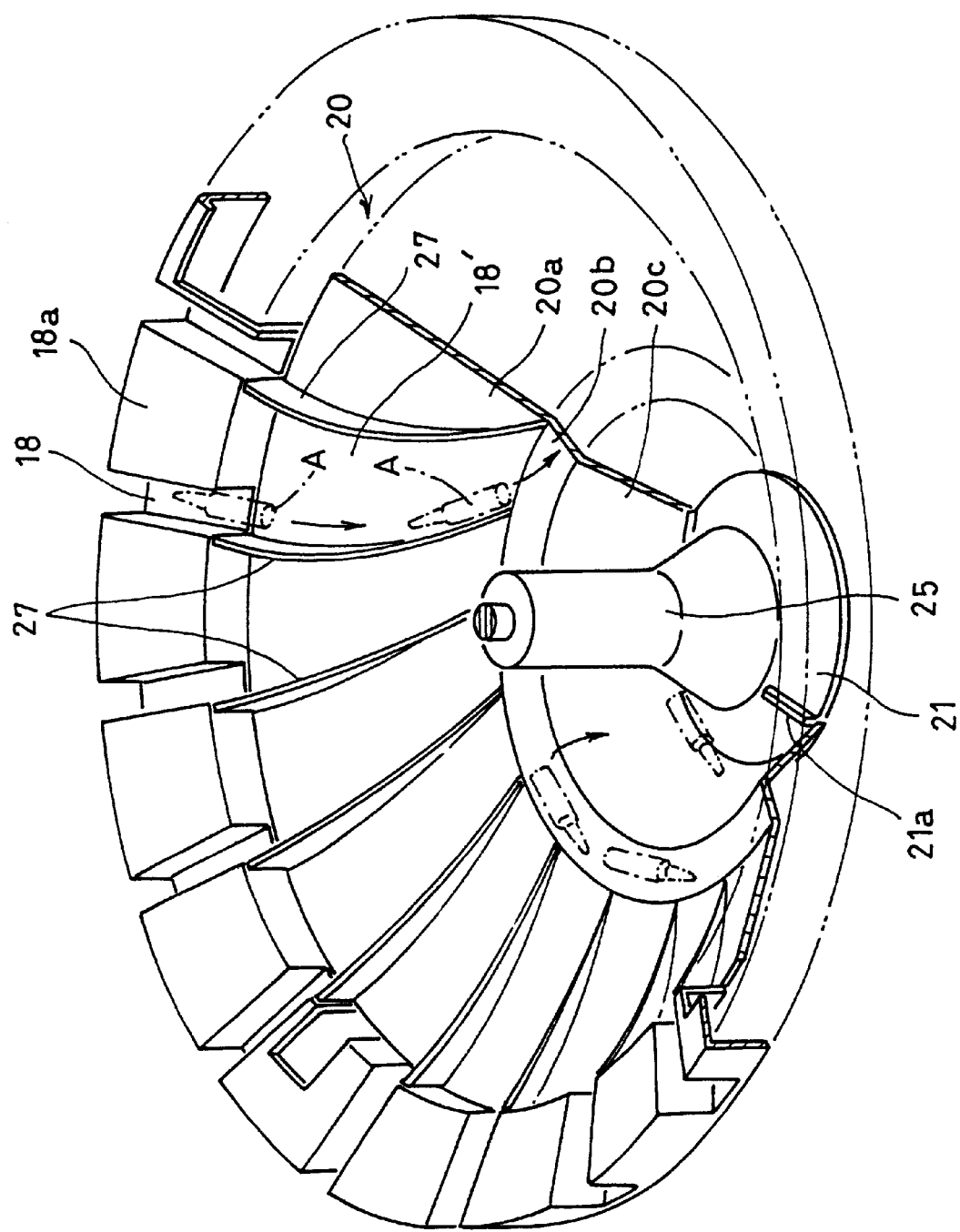
FIG. 10 illustrates the operation of the ampule collector shown in FIG. 8.

Shown in FIGS. 8–10 is an ampule collector representing a second embodiment of the invention. FIG. 8, corresponding to FIG. 5, is a detailed section of the upper portion of the collector. Like FIG. 6, FIG. 9 is a plan view. In this embodiment, a greater number of ampule feeders (18 on each level) are used than in the first embodiment (in which 7 feeders are provided on each level). Discharge ports 18 are provided not separately for individual feeders but formed integrally over the entire circumference.

The ampule collecting container 20 has an ampule sliding slope comprising a plurality of (three in the illustrated example) portions inclined at different angles from each other. The guide vanes 27 of this embodiment are shaped differently from those of the first embodiment. Those are the main differences between the first and second embodiments. Any members identical to those of the first embodiment are denoted by the identical numerals and their description is omitted. Members shown in FIGS. 5 and 6 are all used in the second embodiment even though not shown in FIGS. 8–10.

As shown in FIG. 8, the discharge ports 18 are positioned and sized corresponding to the outlet of the ampule reserve passage 16 of each feeder as in the first embodiment. The discharge ports 18 are defined between guide members 18a arranged at regular angular intervals. One integral discharge portion 18G is provided for feeders 10 on each level. While in the first embodiment the container 20 has a side plate of a constant inclination angle, in the second embodiment the side plates have three portions 20a, 20b and 20c of different inclination angles.

Of the three portions of the ampule sliding slope, the upper portion 20a is steeper than the intermediate portion 20b, and the lower portion 20c is steeper than the upper portion 20a.

The intermediate portion 20b has a width about half the maximum ampule or vial diameter so that, as will be described later, ampules can move in the circumferential direction on the least steep intermediate portion 20b.

A plurality of substantially radially extending arcuate vanes 27 are provided on the upper portion 20a over the entire radial width thereof. The vanes 27 guide radially dropping ampules to feed them in the circumferential direction by receiving ampules in the concave sides thereof. (In the first embodiment, ampules are pushed by the convex sides of the vanes.)

A guide vane 27 is provided for each ampule feeder 10 and positioned so that its top edge aligns with an end face opposite the surface formed with the discharge port 18 of each guide member 18a of the discharge portion 18G. Since the container 20 is moved up and down to collect ampules discharged from selected feeders, there is a small gap between the top edges of the guide vanes 27 and the end faces of the guide members 18a.

The depth of the steepest lower portion 20c is determined such that ampules are not broken when they fall from the intermediate portion onto the bottom cover 21. The ampule sliding slope of the second embodiment comprises the three portions inclined at different angles from each other. But such a slope may be divided into more than three portions having different inclination angles by e.g. dividing the upper portion 20a into two sub-portions having different inclination angles from each other. Guide passages 18' wider than the discharge ports 18 are defined between the adjacent vanes 27.

In its operation, the second embodiment is the same as in the first embodiment. But due to the differences in the ampule discharge portions 18G and the internal shape of the container 20, the operation in the container 20 is slightly different between the first and second embodiment.

This difference is explained with reference to FIG. 10, which is a perspective view of the container 20 of the ampule collector of the second embodiment. Ampules A, discharged radially into the discharge ports 18 from selected ampule feeders 10, are guided along the guide passages 18' and the vanes 27 and change their sliding direction from radial to circumferential direction. Ampules thus land on the intermediate portion 20b of the ampule sliding slope and circle thereon for a while.

When the ampules on the portion 20b lose their momentum, i.e. their circling speed drops, they cannot stay on the intermediate portion 20b, and thus, they and drop along the lower slope onto the bottom cover 21. In FIG. 10, only several ampules are shown. But actually, a far greater number of ampules are discharged at much shorter intervals from feeders and collected on the bottom cover 21.

In the first embodiment, ampules only drop radially. In the second embodiment, the intermediate portion 20b reduces shocks when the ampules drop radially. This dramatically reduces the possibility of breakage of ampules and makes it possible to collect ampules efficiently.

The ampule collector according to this invention has a plurality of ampule feeders stacked one on another. An ampule collector means rises and lowers along the feeders. The ampule collector means has an ampule stirring means and a discharge port. The ampule collector means is raised or lowered to the level of selected feeders to collect ampules from the selected feeders. Ampules discharged thus drop only a short distance. Ampules, discharged continuously or discontinuously to the positions corresponding to the discharge ports are stirred by the stirring means. This prevents breakage and jamming of ampules. Since the collector means itself rises and lowers, the passage from the discharge port of each feeder to the discharge port of the collector means is short. This makes it possible to discharge ampules efficiently in a short time.

What is claimed is:

1. An ampule collector assembly comprising:
   a plurality of ampule feeders stacked one on another so as to define a plurality of levels, each of said ampule feeders being capable of accommodating a plurality of ampules and discharging the ampules one at a time; and an ampule collector capable of rising and lowering along said stacked ampule feeders for collecting ampules from said ampule feeders on each of the levels, said ampule collector including an ampule stirring device and an ampule discharge port.

2. An ampule collector assembly as claimed in claim 1, wherein said ampule collector comprises:

a conical container for directing the ampules collected from said ampule feeders toward a central axis of said ampule collector;

a bottom cover positioned at said ampule discharge port and being moveable between an open position and a closed position, said bottom cover being rotatable about the central axis of said conical container, wherein said ampule stirring device is adapted to stir ampules when said conical container or said bottom cover is rotated with said bottom cover is in the closed position, and to discharge ampules when said bottom cover is in the open position.

3. An ampule collector as claimed in claim 2, further comprising a plurality of guide vanes provided on an interior surface of said ampule collector for changing the orientation of the ampules being collected.

4. An ampule collector assembly as claimed in claim 3, wherein:

said conical container defines an ampule guide slope comprising at least an upper portion, an intermediate portion, and a lower portion;

each of said portions has a different inclination angle relative to the other of said portions as viewed in section;

said intermediate portion is less steep than said upper portion and has a width that is equal to or smaller than a diameter of the ampules; and said ampule guide vanes are arcuate members provided on said upper portion so as to guide falling ampules in a circumferential direction.

5. An ampule collector assembly as claimed in claim 2, wherein said stirring device comprises a plurality of protrusions, provided on an inner surface of said bottom cover, for acting on the ampules in said conical container when said bottom cover is in the closed position.

6. An ampule collector assembly as claimed in claim 5, further comprising a plurality of guide vanes provided on an interior surface of said ampule collector for changing the orientation of the ampules being collected.

7. An ampule collector assembly as claimed in claim 6, wherein:

said conical container defines an ampule guide slope comprising at least an upper portion, an intermediate portion, and a lower portion;

each of said portions has a different inclination angle relative to the other of said portions as viewed in section;

said intermediate portion is less steep than said upper portion and has a width that is equal to or smaller than a diameter of the ampules; and said ampule guide vanes are arcuate members provided on said upper portion so as to guide falling ampules in a circumferential direction.

8. An ampule collector for collecting ampules from a plurality of ampule feeders, said ampule collector comprising:

an ampule container having an open upper end, a lower discharge port, and an inner container wall sloping downwardly from said open upper end to said lower discharge port, said container being movable up and down along a vertical direction;

a rotatable closure positioned in said lower ampule discharge port, said rotatable closure being axially movable between an open position and a closed position;

an ampule stirring structure connected to said rotatable closure; and a rotary drive motor connected to said closure for rotating said closure about a central axis of said container.

9. An ampule collector as claimed in claim 8, wherein said rotatable closure further comprises an elastic member biasing said closure into said closed position.

10. An ampule collector as claimed in claim 9, further comprising:

a container elevator connected to said ampule container; and a closure arm connected to said closure for moving said closure from said closed position to said open position.

11. An ampule collector as claimed in claim 10, further comprising an actuator block positioned so as to engage an end of said closure arm and open said closure upon movement of said ampule container to a lowermost position.

12. An ampule collector as claimed in claim 11, wherein said ampule stirring structure comprises at least one rib projecting from an upper surface of said closure for stirring ampules upon rotation of said closure in said closed position.

13. An ampule container as claimed in claim 12, further comprising a plurality of ampule guide vanes provided on said inner container wall.

14. An ampule container as claimed in claim 13, wherein:

said inner container wall comprises an upper portion, a lower portion, and an intermediate portion, each of said portions having a different inclination angle relative to the other of said portions as viewed in section;

said intermediate portion is less steep relative to said upper portion; and said ampule guide vanes are arcuate members provided on said upper portion.

* * * * *